United States Patent [19]

Ono et al.

[11] Patent Number: 4,685,551
[45] Date of Patent: Aug. 11, 1987

[54] DELIVERY APPARATUS

[75] Inventors: Yoshinobu Ono, Tokyo; Yoshio Watanabe, Kawasaki, both of Japan

[73] Assignee: Fujitsu Limited, Kanagawa, Japan

[21] Appl. No.: 767,466

[22] Filed: Aug. 20, 1985

[30] Foreign Application Priority Data

Aug. 31, 1984 [JP] Japan .................................. 59-181968

[51] Int. Cl.$^4$ .............................................. B65G 47/00
[52] U.S. Cl. .................................. 198/346.2; 198/817
[58] Field of Search ................... 198/346.2, 345, 463.3, 198/817, 458; 414/77, 80

[56] References Cited

U.S. PATENT DOCUMENTS 3,840,064 10/1974 Von Woff ........................ 198/631 X
3,860,232 1/1975 Martin ............................. 198/458 X
4,217,977 8/1980 Tam .................................. 198/345
4,336,438 6/1982 Uehara et al. ............... 198/346.2 X
4,534,157 8/1985 McGill et al. ................... 198/463.3

FOREIGN PATENT DOCUMENTS 3338994 5/1984 Fed. Rep. of Germany .
2137414A 10/1984 United Kingdom .

Primary Examiner—Joseph E. Valenza
Assistant Examiner—D. Glenn Dayoan
Attorney, Agent, or Firm—Armstrong, Nikaido, Marmelstein & Kubovcik

[57] ABSTRACT

An apparatus for delivering an article, in which the delivery passage per se must be moved, comprises a pair of delivery belts substantially parallel to each other and supporting members for supporting the delivery belts, a mechanism for turning the paired delivery belts with the ends of the supporting members acting as the centers of turning so that the paired delivery belts are separated from each other from the substantially parallel position.

4 Claims, 10 Drawing Figures

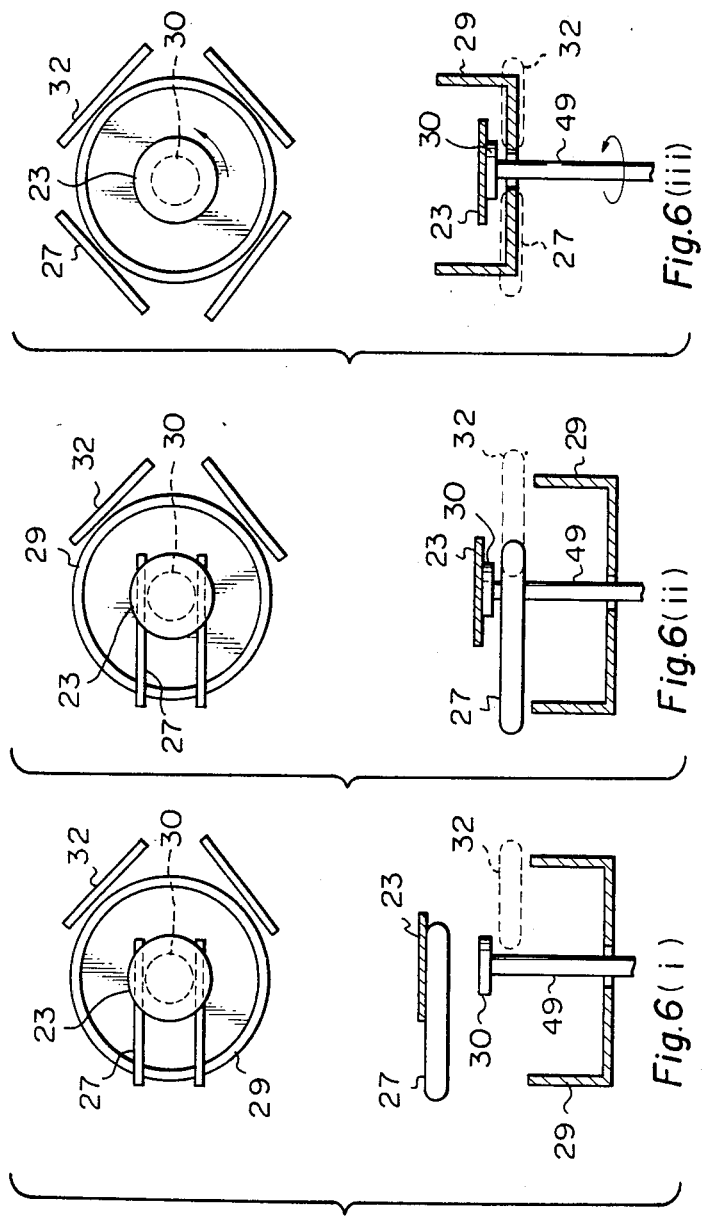

DELIVERY APPARATUS

BACKGROUND OF THE INVENTION

1. Field of the Invenion

The present invention relates to a delivery apparatus. More particularly, the present invention relates to a delivery apparatus in which a delivery passage per se must be moved to effect delivery of an article to be delivered.

2. Description of the Related Art

In the process for the fabrication of semiconductor devices, a semiconductor wafer is automatically delivered to points in the production line by a delivery apparatus such as a belt conveyor. When the semiconductor wafer is coated with a photoresist or an etching treatment is carried out after light exposure, a resist solution or etching solution is coated on the wafer while spinning the wafer at a high speed, and a spinner is used for this operation. After the wafer is delivered to this spinner, the rotary chuck portion of the spinner is covered with a cylindrical cover to prevent scattering of the coating solution during the spinning operation. Accordingly, the belt conveyor must be moved away from the spininer to allow the cylindrical cover to move into a protective position. In the conventional apparatus for delivering a semiconductor wafer, a loader and an unloader are provided as two separate mechanisms for placing wafer on and removing it from the spinner. These loading and unloading mechanisms must be moved to and fro between a position above the rotary chuck and the pre-loading and unloaded positions, respectively. Accordingly, the overall length of the system must be increased, necessitating the provision of a large space for installation of the apparatus. The above will be described in more detail later, with reference to the attached drawings.

SUMMARY OF THE INVENTION

It is a primary object of the present invention to eliminate the above defect of the conventional technique and provide a delivery apparatus in which a delivery passage is shifted from the delivery position after the delivery of an article to be delivered, such as a wafer, this delivery apparatus being characterized in that the space factor is improved by adopting a compact structure such that the apparatus can be installed in a smaller area.

In accordance with the present inveniton, this object can be attained by a delivery apparatus comprising delivery means including a pair of delivery belts substantially parallel to each other and supporting members for supporting the delivery belts, and a mechanism for horizontally turning the paired delivery belts with the ends of the supporting members acting as the centers of turning so that the paired delivery belts are separated from each other from the substantially parallel position.

DESCRIPTION OF THE PREFERRED EMBODIMENTS

To enable a better understanding of the advantages of the present invention, a conventional apparatus for delivering a semiconductor wafer to a spinner will now be described with reference to FIGS. 1 and 2.

Figure 1:
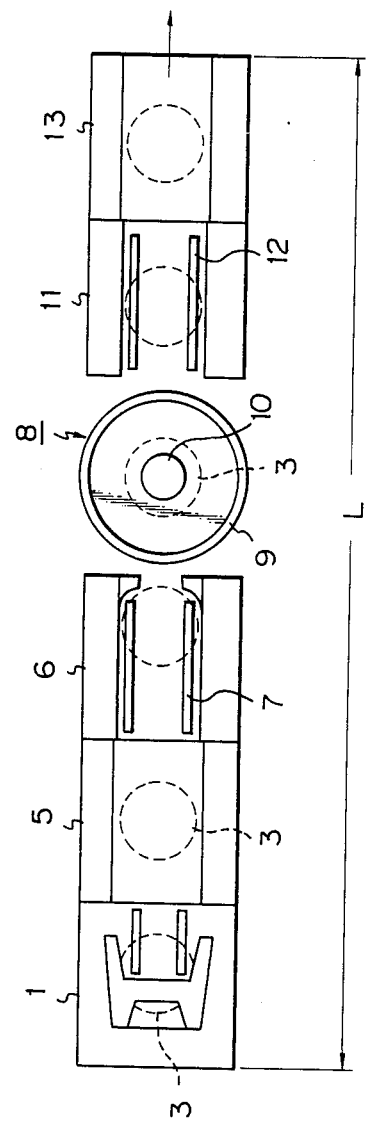
FIG. 1 is a top view of a conventional delivery system.
Figure 2:
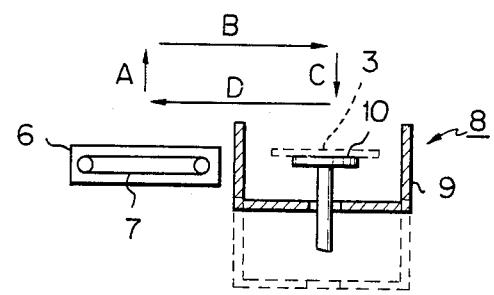
FIG. 2 is a diagram illustrating the operation of the conventional delivery apparatus.

FIG. 1 is a top view showing the entire structure of the delivery system. Referring to FIG. 1, each wafer 3 supported one by one from a wafer feed station 1 is subjected to a preliminary treatment such as a pre-baking treatment in a pretreatment device 5 and is then loaded onto a belt conveyor 7 of a loader 6. A spinner 8 comprises a vertically movable cylindrical cover 9 and a vacuum chuck table 10. As shown in FIG. 2, the loader 6 moves upward (arrow A), moves above the table 10 (arrow B), subsequently moves downward (arrow C) to place the wafer 3 on the vacuum chuck table 10, and returns to its original position (arrow D). At this point, the cylindrical cover 9, which was lowered as indicated by a dotted line, is raised and spin coating is effected. An unloader 11 then exerts a function in reverse to the function of the loader 6, and the wafer 3 on the vacuum chuck table 10 is loaded onto a belt conveyor 12 of the unloader 11 and delivered to a post treatment device 13. In this conventional delivery system, both the loader 6 and unloader 11 must be moved to and from the rotary chuck 10 of the spinner 8. Accordingly, the length L of the entire system must be increased and a large space becomes necessary for installation of the spin coating apparatus.

Figure 3:
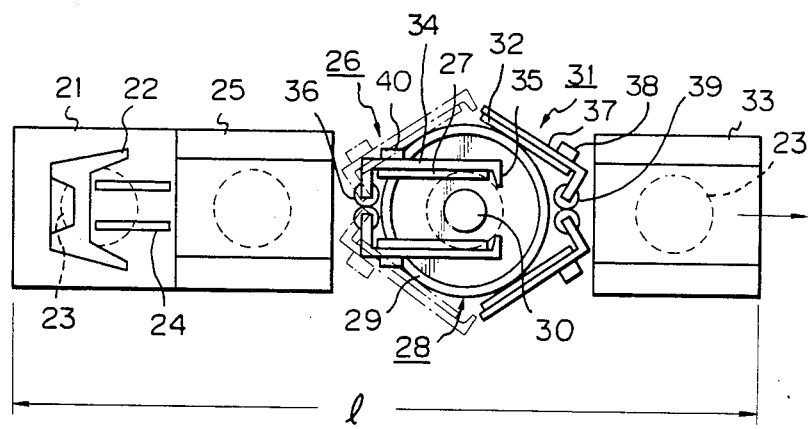
FIG. 3 is a top view of the delivery system according to the present invention.

FIG. 3 is a top view of the delivery system at the spin-coating treatment using the delivery apparatus of the present invention. Referring to FIG. 3, an elevator 22 in which a plurality of wafers 23 are contained in the horizontally piled state is arranged in a wafer feed station 21. A pair of belt conveyors 24 are arranged at the lowermost position of the elevator, and the lowermost wafer among the piled wafers 23 is taken out and delivered to an adjacent pretreatment device 25 where the wafer 23 is subjected to a pre-baking treatment. The pretreatment device 25 comprises an air conveyor mechanism (not shown) for delivering the wafer 23 to a loader 26 which constitutes the delivery apparatus of the present invention.

Figure 4:
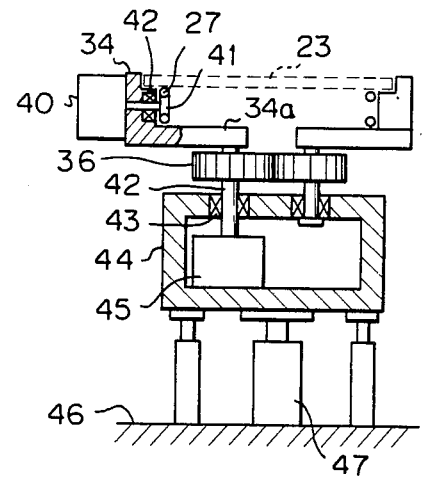
FIG. 4 is a longitudinally sectional view of the delivery apparatus of the present invention seen from the delivery direction.
Figure 5:
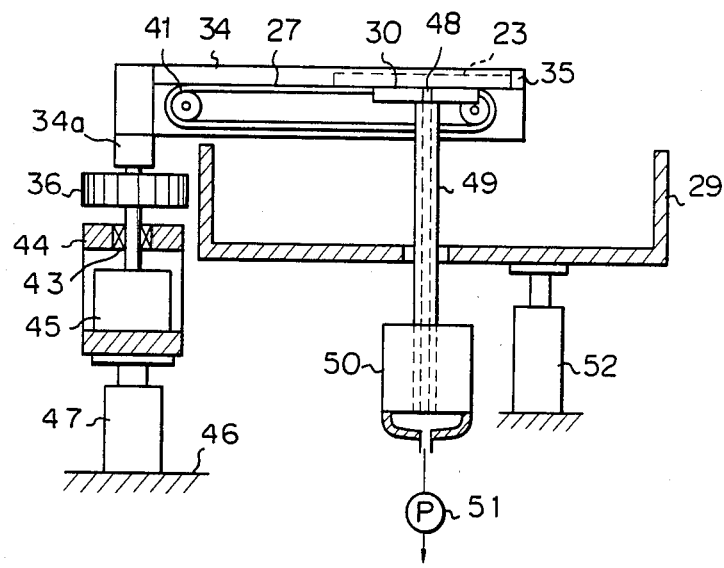
FIG. 5 is a longitudinally sectional view of the delivery apparatus of the present invention seen from the direction at a right angle to the delivery direction.

The loader 26 comprises a pair of delivery belts 27 attached to and supported on frames 34 through pulleys 41, as shown in FIGS. 4 and 5, and the delivery belts 27 are driven by a motor 40 secured to the frames 34. Reference numeral 42 (FIG. 4) represents a bearing. Stoppers 35 are arranged on the top end portions of the frames 34 with respect to the wafer delivering direction and gears 36 are attached to the other end portions 34a of the frames 34. The gears 36 of both the frames 34 are engaged with each other. A shaft 42 of one gear 36 is connected to a motor 45 which is secured to a supporting frame 44. Reference numeral 43 represents a bearing. The supporting frame 44 can be moved vertically by a fluid-driven cylinder 47, and the loader 26 as a whole is vertically moved by this cylinder 47. A pair of the delivery belts 27 can be turned from the parallel delivery position (indicated by a solid line in FIG. 3) to the mutually separated open-leg position (indicated by a one-dot chain line in FIG. 3) by rotation of the engaged gears 36. A space is formed between both the delivery belts 27, and a vacuum chuck table 30 of a spinner 28 can be inserted in this space.

At the above-mentioned delivery position, the top end portions of the delivery belts 27 are located above the vacuum chuck table 30 of the spinner 28, and the wafer can be delivered onto the vacuum chuck table 30 by lowering the delivery belts 27. At the open-leg position of the delivery belts 27, the belts 27 are separated from each other to such an extent that the cylindrical cover 29 of the spinner 28 can be raised and inserted between the delivery belts 27. The vacuum chuck table 30 has a suction port 48 (FIG. 5) and is connected to a motor 50 through a hollow rotation shaft 49. The hollow rotation shaft 49 is connected to a vacuum pump 51 to attract to and secure the wafer 23 on the table 30. The cylindrical cover 29 can be vertically moved by a fluid-driven cylinder 52.

An unloader 31 (FIG. 3) is arranged at a position confronting the loader 26 to deliver the wafer after the spin-coating treatment. The structure and function of the unloader 31 are principally the same as those of the loader 26. A pair of belts 32 are attached to frames 37 and driven by a motor 38. As in the case of the loader 26, both the delivery belts 32 of the unloader 31 can be turned between the open and closed positions by gears 39 arranged on the end portions of the frames 37. However, stoppers 35 as disposed for the loader 26 need not be disposed for the unloader 31. A post treatment device 33 is arranged downstream of the unloader 31 and the spin-coated wafer is subjected to an after-baking treatment. The post treatment device 33 is provided with air conveyor means (not shown) for delivering and discharging the wafer 23 along a direction shown by an arrow in FIG. 3, and the wafer 23 is thus fed to a subsequent step.

The operation sequence of the spin-coating treatment using the above-mentioned loader and unloader will now be described with reference to FIGS. 6-(i) through 6-(v), each of which is a schematic view of the spinner zone, in which the upper part is a top view and the lower part is a longitudinal section view.

Figures 6, 6V:
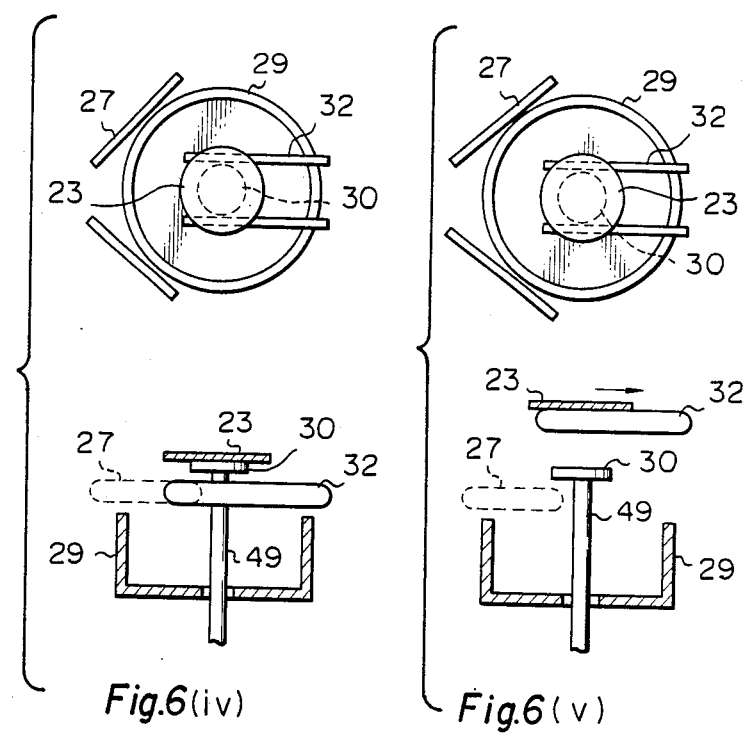
FIG. 6 (i) thru (v) are diagrams with top and side views illustrating the operation sequence in the delivery apparatus of the present inveniton.

In the state where the cover 29 is lowered and the conveyors 32 of the unloader 31 are opened, the wafer 23 is delivered to a position above the vacuum chuck table 30 by the conveyors 27 of the loader 26 [FIG. 6-(i)]. In this state, the conveyors 27 of the loader 26 are lowered to place the wafer 23 on the vacuum chuck table 30 [FIG. 6-(ii)]. Then, the belts 27 of the loader 26 are opened and the cover 29 is raised, and the rotation shaft 49 is rotated to effect the spin-coating treatment of the wafer 23 [FIG. 6-(iii)]. After completion of the spin-coating treatment, the cover 29 is lowered and the conveyors 32 of the unloader 31 are placed in the closed position [FIG. 6-(iv)]. Subsequently, the conveyors 32 of the unloader 31 are raised and the wafer 23 is shifted from the vacuum chuck table 30 onto the conveyors 32 and delivered in a direction shown by an arrow [FIG. 6-(v)]. After the wafer 23 is discharged, the conveyors 32 of the unloader 31 are placed in the open state, and the conveyors 27 of the loader 26 are closed and raised to deliver a subsequent wafer, and the state shown in FIG. 6-(i) is restored.

As is apparent from the foregoing illustration, in the delivery apparatus of the present invention, a pair of belt conveyor means are arranged so that they can be turned with end portions thereof acting as the centers of turning, and by the opening and closing operations, the belt conveyor means are brought to and away from the position for the delivery of an article to be delivered. Accordingly, the space with respect to the delivery direction can be diminished, and as shown in FIG. 3, the overall length l of the delivery system can be shortened and the space can be effectively utilized.

We claim:

1. A delivery apparatus comprising: delivery means including a pair of delivery belts substantially parallel to each other during conveying of an article and supporting members for supporting said delivery belts, said delivery means being movable between a closed position where the paired delivery belts are parallel to each other and an open position where the paired delivery belts are in an open-leg shape; a pivot means by which leading ends of each of said paired delivery belts are pivoted outwardly about pivot points in the region of trailing ends of said supporting members so that each of the leading ends of said delivery belts diverges outwardly to said open position; and a delivery station disposed between said paired delivery belts at the leading ends thereof, wherein the article is transferred between the delivery station and the delivery belts when the delivery belts are in the closed position, and a treatment of the article placed on the delivery station is conducted when the delivery belts are in the open position.

2. A delivery apparatus according to claim 1, wherein gears engaged with each other are arranged on said pivot points, and one of said gears is connected to drive means to constitute said pivot means.

3. A delivery apparatus according to claim 1, wherein at least one of said delivery means and said delivery station is vertically movable with respect to the other.

4. A delivery apparatus according to claim 3, wherein an article to be delivered is transferred between the delivery belts and the delivery station by the relative vertical movement therebetween.

* * * * *

UNITED STATES PATENT AND TRADEMARK OFFICE
CERTIFICATE OF CORRECTION

PATENT NO.  :   4,685,551
DATED       :   August 11, 1987
INVENTOR(S) :   ONO et al It is certified that error appears in the above-identified patent and that said Letters Patent is hereby corrected as shown below:

On the cover page, Item [73], "Eujitsu Limited" should read --Fujitsu Limited--.

Signed and Sealed this

Twelfth Day of April, 1988

*Attest:*

DONALD J. QUIGG

*Attesting Officer*  Commissioner of Patents and Trademarks